United States Patent [19]

Takahashi

[11] Patent Number: 5,066,094
[45] Date of Patent: Nov. 19, 1991

[54] VARIABLE OPTICAL FIBER LIGHT ATTENUATOR

[75] Inventor: Mitsuo Takahashi, Matsudo, Japan

[73] Assignee: Seikoh Giken Co., Ltd., Matsudo, Japan

[21] Appl. No.: 655,134

[22] Filed: Feb. 7, 1991

[30] Foreign Application Priority Data

Sep. 7, 1990 [JP] Japan ............................. 2-238737
[JP] Japan ............................. 2-238737

[51] Int. Cl.⁵ .............................................. G02B 6/38
[52] U.S. Cl. ....................................... 385/73; 385/140
[58] Field of Search ............... 350/96.15, 96.16, 96.20, 350/96.21, 96.29

[56] References Cited

U.S. PATENT DOCUMENTS

| | | | |
|---|---|---|---|
| 4,165,496 | 8/1979 | Di Domenico, Jr. et al. | 350/96.15 X |
| 4,281,925 | 8/1981 | Forrest et al. | 350/96.15 |
| 4,519,671 | 5/1985 | Curtis et al. | 350/96.15 |
| 4,529,262 | 7/1985 | Ashkin et al. | 350/96.15 |
| 4,636,030 | 1/1987 | Carter et al. | 350/96.18 |
| 4,666,243 | 5/1987 | Rogstadius et al. | 350/96.21 |
| 4,717,234 | 1/1988 | Barlow et al. | 350/96.21 |
| 4,736,100 | 4/1988 | Vastagh | 350/96.20 |
| 4,753,510 | 6/1988 | Sezerman | 350/96.21 |
| 4,753,511 | 6/1988 | Bowers et al. | 350/96.21 |
| 4,893,889 | 1/1990 | Iwakiri et al. | 350/96.15 |
| 4,958,897 | 9/1990 | Yanagawa et al. | 350/96.15 |
| 4,978,193 | 12/1990 | Tomita | 350/96.21 |

FOREIGN PATENT DOCUMENTS

| | | | |
|---|---|---|---|
| 0089758 | 9/1983 | European Pat. Off. | 350/96.13 X |
| 60-176003 | 9/1985 | Japan | 350/96.20 X |
| 2114769 | 8/1983 | United Kingdom | 350/96.21 X |

Primary Examiner—Brian Healy
Attorney, Agent, or Firm—Spencer & Frank

[57] ABSTRACT

A variable light attenuator of optical connector type. It consists of an alignment adapter, first ferrule fastening means, and second ferrule fastening means. The alignment adapter provides an alignment through hole concentrically passing therethrough along the optical axis thereof. First ferrule fastening means fastens first ferrule whose edge is exposed to an intermediate air gap and is 7 degrees or more inclined to a plane perpendicular to the optical axis, passes the first ferrule through the alignment through hole, and fastens the first ferrule to the alignment adapter. Second ferrule fastening means fastens second ferrule which is almost the same as first ferrule fastening means in both structure and functions, but movable along the optical axis to appropriately set the gap between the first and second ferrules while the edges of the first and second ferrules are kept in parallel by key pin and key groove to specify the designated attenuation.

9 Claims, 5 Drawing Sheets

VARIABLE OPTICAL FIBER LIGHT ATTENUATOR

BACKGROUND OF THE INVENTION

The present invention relates to a variable light attenuator which is used to continuously attenuate the optical power being transmitted through the optical fiber communication circuit, and especially to the variable light attenuator of high-performance type wherein the harmful reflection light loss is extremely reduced.

A variety of variable light attenuators have been proposed and used to attenuate the optical power passing through the optical fiber communication circuits.

FIG. 6 is a side view of the conventional variable light attenuator, wherein the transmittance continuously varies as a glass plate 3 goes up or down.

In FIG. 6, 1 and 2 are rod lenses arranged along the optical axis of transmission path 4, and 3 is the glass plate whereon a metal thin film is deposited so that the photographic density continuously varies with the position thereof. Glass plate 3 is placed inbetween rod lenses 1 and 2 along transmission path 4 so that the photographic density continuously varies with the position thereof.

When glass plate 3 moves orthogonally to the optical axis (which is indicated by arrow) on an adjusting device (not shown), the light power on transmission path 4 decreases or increases responding to the motion of glass plate 3. At that time, the reflection of the light power at the interfaces between the right-hand surface of rod lens 1 and the left-hand surface of glass plate 3, and between the right-hand surface of glass plate 3 and the left-hand surface of rod lens 2 causes the optical power loss. If a greater percentage of the reflected light power goes back to the light source, the light source becomes unstable.

This type of variable light attenuator sometimes operates unstably because the transmittance of glass plate 3 changes with elapsing of time causing unstable attenuation.

If the distance between the faced edges of a pair of ferrules in an optical connector can be controlled by adjuster, the optical power loss changes as well known by the personnel skilled in the art.

FIG. 7 shows a cross-sectional view of the variable light attenuator wherein the optical power loss can continuously be changed by adjusting the distance between the faced edges of a pair of ferrules.

The connector structure wherein the distance between the faced edges of a pair of ferrules in the optical connector can be controlled by adjuster, as shown in FIG. 7, was proposed by the inventor of the present invention (Japanese Patent Application No. 5849/1990).

Alignment adapter 5 is a cylinder made of a metal, at the center of which through hole 20 is provided to insert ferrules 14 and 15.

Female screw 22 of larger diameter than through hole 20 is provided at the edge in the inner surface of the through hole 20, and the screw 22 is connected with adjusting screw nut 21.

Screws 12 and 13 are provided at the edges on the circumferences of the outer cylinders in alignment adapter 5 and they are coupled with screws 10 and 11 of coupling nuts 8 and 9 in optical connector plugs 6 and 7, respectively.

Key grooves 18 and 19 are provided on screws 12 and 13 so that they can mate with keys 16 and 17 on the outer cylinders of ferrules 14 and 15 in optical connector plugs 6 and 7, respectively.

Compressed coil spring 31 is inserted into the inner of coupling nut 8 and within a gap between coupling nut 8 and flange of ferrule 14, and compressed coil spring 23 is inserted into the interior of the coupling nut 9 and within a gap between coupling nut 9 and flange of ferrule 15. These coil springs 23 and 31 are used to press ferrules 14 and 15 toward the center of the alignment adapter 5. Stop rings 24 and 25 mate with grooves 26 and 27 of ferrules 14 and 15, respectively. Hollow 28 is provided so that adjusting screw nut 21 can rotate around the optical axis of alignment adapter 5.

How to set the attenuation on the variable light attenuator will briefly be described hereafter.

Set adjusting screw nut 21 and then connect optical connector plugs 6 and 7 to alignment adapter 5 as illustrated above. Connect optical fiber 29 to a light source (not shown), and also optical fiber 30 to an optical powermeter (not shown). Then, read the optical power attenuation on the optical powermeter.

Revolve adjusting screw nut 21 a little after detaching optical connector plug 7 from alignment adapter 5, attach optical connector plug 7 to alignment adapter 5, and then read the attenuation by optical powermeter to check if the attenuation is as specified. Repeat the above operations until the specified amount of attenuation can be obtained at designated gap S.

The above operation procedures are too much complicated, and the light power loss which may be caused by the reflection of light at the interfaces between the optical component surfaces and the intermediate air gaps is of 10 to 12 dB in most cases. This greater power loss prohibits this type of variable light attenuator from the use in long-distance, high-capacity communications or in video signal communications.

The objective of the present invention is to provide a new type of variable light attenuator with a reduced light power loss at the interfaces between the optical component surfaces and the intermediate air gaps, wherein attenuation can be set as specified by easy and simple operation procedures.

SUMMARY OF THE INVENTION

The variable light attenuator built in accordance with the present invention, wherein the edges of a pair of ferrules at the center thereof are finished 7 degrees or more inclined to a plane perpendicular to the optical axis of the pair of ferrules, consists of first ferrule whose edge is kept fastened, and second ferrule whose edge can be forwarded/reversed in parallel with the first ferrule along the optical axis thereof so that the attenuation can be changed with the change of gap S between the first and second ferrules.

This structure allows the attenuation to be set as specified without such repetitive operations as attaching second ferrule to the alignment adapter, measuring the attenuation, and detaching second ferrule from the alignment adapter to adjust gap S between first and second ferrules unless the attenuation is as specified.

The variable light attenuator built in accordance with the present invention is the type which transmits light power from first to second optical fibers through first and second ferrules after attenuating it by the specified ratio of light power when the light power input from the first optical fiber to first ferrule is transmitted to second optical fiber through second ferrule which is coupled with the first ferrule via an intermediate air gap for use in optical power attenuation.

This variable light attenuator consists of an alignment adapter, first ferrule fastening means, and second ferrule fastening means.

The alignment adapter provides an alignment through hole concentrically passing therethrough along the optical axis thereof.

First ferrule fastening means fastens first ferrule whose edge is exposed to the intermediate air gap together with the edge of the first optical fiber and is a certain degree inclined to the optical axis, passes the first ferrule through the alignment through hole, and then fastens the first ferrule to the alignment adapter.

Second ferrule fastening means fastens second ferrule whose edge is exposed to the intermediate air gap together with the edge of the second optical fiber is inclined to the optical axis thereof the same degrees as those of the first ferrule, inserts the second ferrule to the alignment through hole in the opposite side to that whereto the first ferrule is inserted, advances the second ferrule toward the first ferrule without revolving the second ferrule, and sets the gap between the first and second ferrules at an arbitrary value while keeping the edge of the first ferrule together with the edge of first optical fiber in parallel with the edge of the second ferrule together with the edge of the second optical fiber.

The structure of the first ferrule fastening means is the same as that of the second ferrule fastening means.

The first and second ferrules respectively having the edges which are exposed to the intermediate air gap together with the edges of the first and second optical fibers are finished the same 7 degrees or more inclined to the optical axis common to the first and second ferrules.

The alignment adapter provides a greater (in diameter) central portion than that of its edge portions whereto screws with key grooves are provided.

The second ferrule fastening means provides a circular flange in the rear portion thereof and a key pin which can fit to the key groove of the alignment adapter. The second ferrule fastening means further consists of a ferrule holder, an adjusting nut, and stop means.

The ferrule holder is used to guide the edge of the second ferrule to the alignment through hole so that the second ferrule can pass through the alignment through hole along the optical axis thereof.

The adjusting nut is a cap nut which can be coupled to a screw of the alignment adapter in an open side thereof, and which provides a through hole to fasten the ferrule holder to cause the second optical fiber to pass through at the center of the cap portion thereof, so as to mate with the circular flange of the ferrule holder.

Stop means clamps the ferrule holder wherewith the through hole of the adjusting nut can mate, and the located to the other side of the circular flange of the ferrule holder while there exists a gap between the circular flange and the stop means so that the cap nut can revolve on the ferrule holder.

The stop means can be a nut which can mate with another screw provided on the circumference at the outer edge of the ferrule holder, or they can be stop ring which can mate with a groove provided on the circumference at the outer edge of the ferrule holder.

A locknut can further be used for fastening the adjusting nut to the stop means.

BRIEF DESCRIPTION OF THE DRAWINGS

FIG. 2(a) indicates an enlarged cross-sectional view of one stopper where a nut is used as the stopper. FIG. 2(b) indicates an enlarged cross-sectional view of other stopper where a stop ring is used as the stopper.

PREFERRED EMBODIMENTS

The present invention will be described hereafter referring to the attached drawings.

Figure 1:
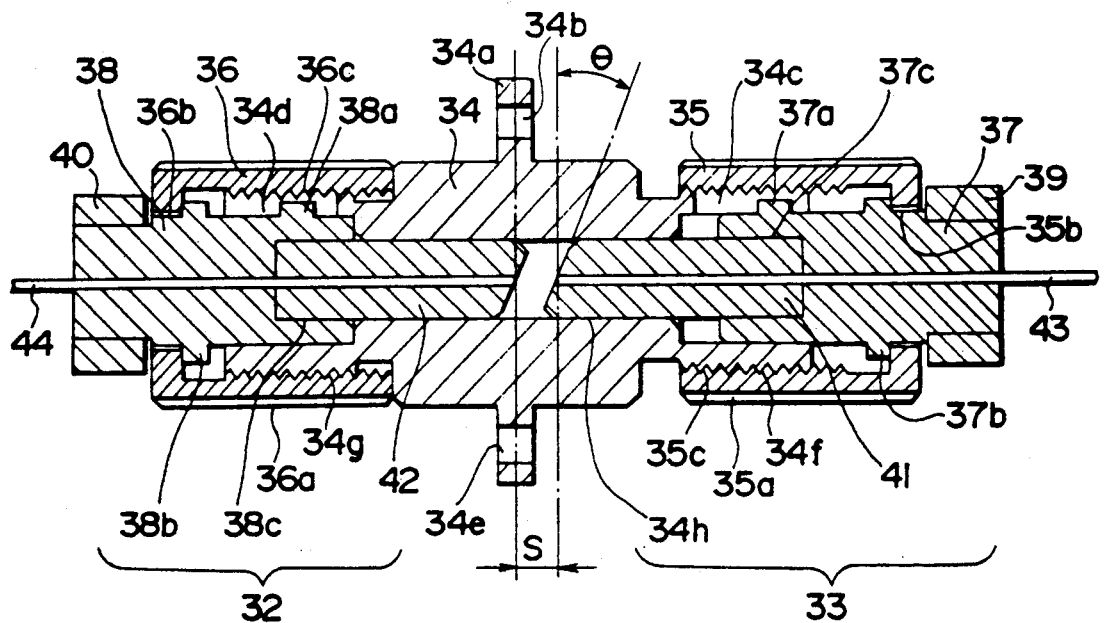
FIG. 1 shows a cross-sectional view of an embodiment of the variable light attenuator according to the present invention.

FIG. 1 is a cross-sectional view of an embodiment of the variable light attenuator according to the present invention.

In FIG. 1, the light power input from optical fiber 44 is transmitted to optical fiber 43 which is coupled with optical fiber 44 with some attenuation, or the light power input from optical fiber 43 is transmitted to optical fiber 44 which is coupled with optical fiber 43 with some attenuation.

The variable light attenuator consists of first optical connector plug 32 shown in the left of FIG. 1, alignment adapter 34, and second optical connector plug 33 shown in the right of FIG. 1.

Alignment adapter 34 provides alignment through hole 34h both at the center and edges thereof, and screws 34f and 34g at both edges thereof. Alignment through hole 34h consists of small diameter hole portion at the center thereof, and other large diameter portions, at both edges thereof. Screws 34f and 34g provide their own key grooves 34c and 34d, respectively.

The outer diameter of alignment adapter 34 at the center thereof is greater than those at the edges thereof, whereon screws 34f and 34g are provided. Flange 34a to support the variable light attenuator on a panel etc. is provided at the center thereof. Holes 34b and 34e on flange 34a support the variable light attenuator on a panel of a cabinet (not shown).

Outer diameters of first and second ferrules 42 and 41 are just smaller than that of alignment through hole 34h at the center thereof, and the first and second ferrules 42 and 41 can smoothly go into alignment through hole 34h without any play.

The edges of first and second ferrules 42 and 41 are 7 degrees or more ($\theta$) inclined to the plane perpendicular to the optical axis thereof.

First ferrule holder 38 provides hollow 38c to support first ferrule 42, and first ferrule 42 is forcibly inserted into hollow 38c to combine first ferrule 42 with first ferrule holder 38 together. First ferrule holder 38 provides key pin 38a which can mate with key groove 34d, and circular flange 38b which contacts with the outer peripheral edge of through hole 36b within adjusting nut 36.

Second ferrule holder 37 provides hollow 37c to support second ferrule 41, which has the same structure as first ferrule holder 38, and second ferrule 41 is forcibly inserted into hollow 37c to combine second ferrule 41 with second ferrule holder 37 together. Second ferrule holder 37 provides key pin 37a which can mate with key groove 34c, and circular flange 37b which contacts with the outer peripheral edge of through hole 35b within adjusting nut 35.

First adjusting nut 36 is a cap nut with knurling 36a on the outer surface thereof, and through hole 36b mates with first ferrule holder 38. Female screw 36c is provided on the inner surface of the opening of first adjusting nut 36, and couples with screw 34g of alignment adapter 34.

The inner surface of through hole 36b of first adjusting nut 36 touches the side plane of flange 38b of first ferrule holder 38, bush 40 is fit to first ferrule holder 38 so that the outer surface of first adjusting nut 36 around through hole 36b touches bush 40, and that first adjusting nut 36 can revolve around the optical axis while the motion of first adjusting nut 36 along the optical axis of first ferrule holder 38 is restricted by bush 40.

Second adjusting nut 35 is a cap nut with knurling 35a on the outer surface thereof, and through hole 35b mates with second ferrule holder 37. Screw 35c is provided on the inner surface of the opening of second adjusting nut 35, and couples with screw 34f of alignment adapter 34.

The inner surface of through hole 35b of second adjusting nut 35 touches the side plane of flange 37b of second ferrule holder 37, bush 39 is fit to second ferrule holder 37 so that the outer surface of second adjusting nut 35 around through hole 35b touches bush 39, and that second adjusting nut 35 can revolve around the optical axis while the motion of second adjusting nut 35 along the optical axis of second ferrule holder 37 is restricted by bush 39.

A gap of 0.01 mm to 0.02 mm is required between the outer surfaces of first and second adjusting nuts 36 and 35 around through holes 36b and 35b and bushes 40 and 39 which are fit to first and second ferrule holders 38 and 37, so that adjusting nuts 36 and 35 can revolve smoothly around first and second ferrule holders 38 and 37.

An example of the bush to restrict the motion of the adjusting nuts along the optical axis on the ferrule holders was explained in the above.

Figure 2A:
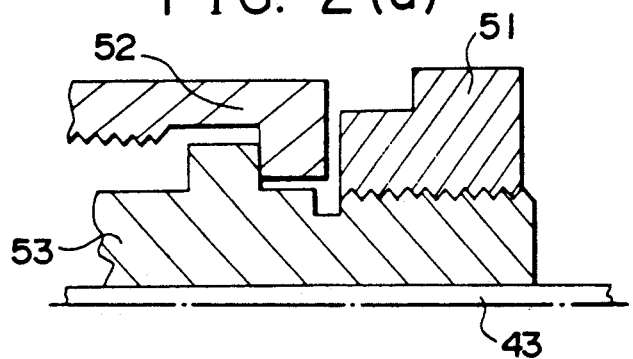
FIGS. 2(a) and 2(b) are enlarged cross-sectional views of another embodiment of the present invention showing the mechanism to set the adjusting nut to the ferrule holder so that the adjusting nut can revolve around the ferrule holder.

A screw provided behind ferrule holder 53 can be coupled with nut 51, as shown in FIG. 2(a), to restrict the motion of adjusting nut 52 along the optical axis.

Figure 2B:
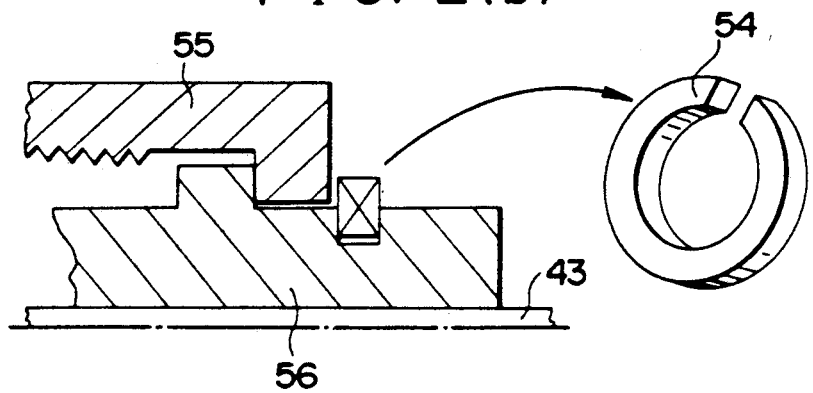

A groove provided behind ferrule holder 56 can mate with stop ring 54, as shown in FIG. 2(b), to restrict the motion of adjusting nut 55 along the optical axis.

How to set the attenuation on the variable light attenuator as specified will be described below.

Referring to FIG. 1, connect first optical fiber 44 to a light source (not shown), and second optical fiber 43 to an optical powermeter (not shown).

In first optical connector plug 32 where first ferrule is fixed with respect to alignment adapter 34, adjsuting nut 36 couples with screw 34g of alignment adapter 34, the right-hand edge of adjusting nut 36 advances to the stepwise extruded portion of alignment adapter 34 and then alignment adapter 34 is fastened there.

In the process of advancing adjusting nut 36, key pin 38a is guided by key groove 34d so that first ferrule does not revolve during the advancement of adjusting nut 36, and thus the right-hand edge of adjusting nut 36 is kept unrevolved.

Adjusting nut 35 of second optical connector plug 33 couples with screw 34f of alignment adapter 34, and then advances as it revolves on screw 34f of alignment adapter 34. Second optical connector plug 32 is the same as first optical connector plug 33 in structure, and the left-hand edge of second ferrule 41 also advances without revolution around its optical axis. This is the reason why the right-hand edge of first ferrule 42 is kept in parallel with the left-hand edge of second ferrule 41. Advance adjusting nut 35 while reading the attenuation on the powermeter until the attenuation becomes the specified value.

Figure 3:
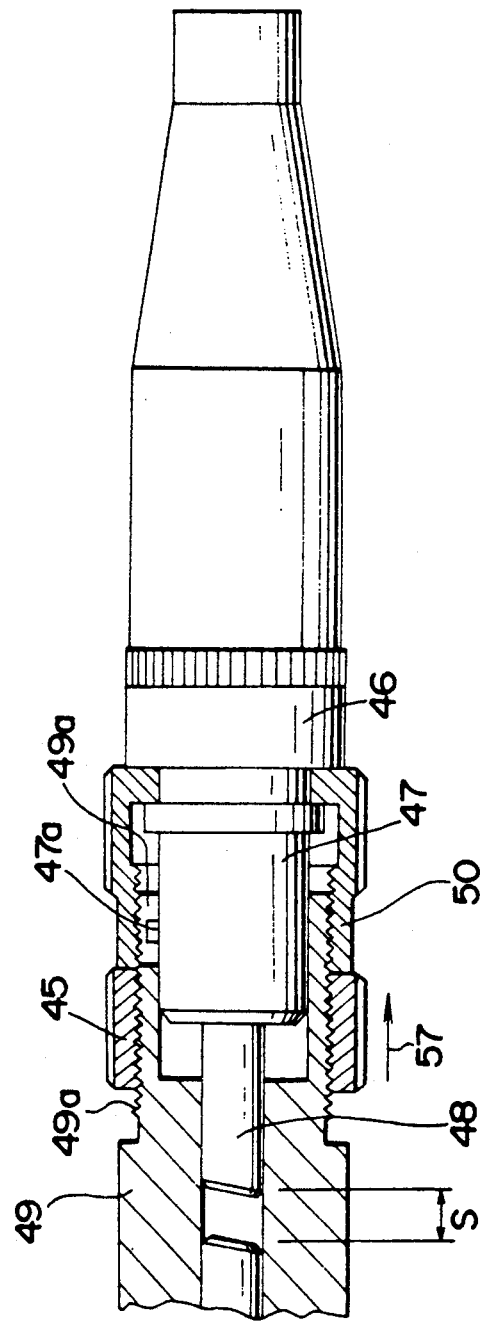
FIG. 3 is a side view of a further embodiment of the present invention showing the mechanism to lock the adjusting nut after the adjustment.

In FIG. 1, distance S between first ferrule 42 and second ferrule 41 is shown to be as specified. After distance S becomes the specified value, adjusting nut 35 is to be fastened. FIG. 3 shows how to fasten adjusting nut 35.

Lock nut 45, at first, couples with the left-hand edge of screw 49a of alignment adapter 49. When adjusting nut 50 is positioned to indicate the designated attenuation, lock nut 45 is to be moved toward arrow 57 until adjusting nut 50 is fastened.

Figure 4:
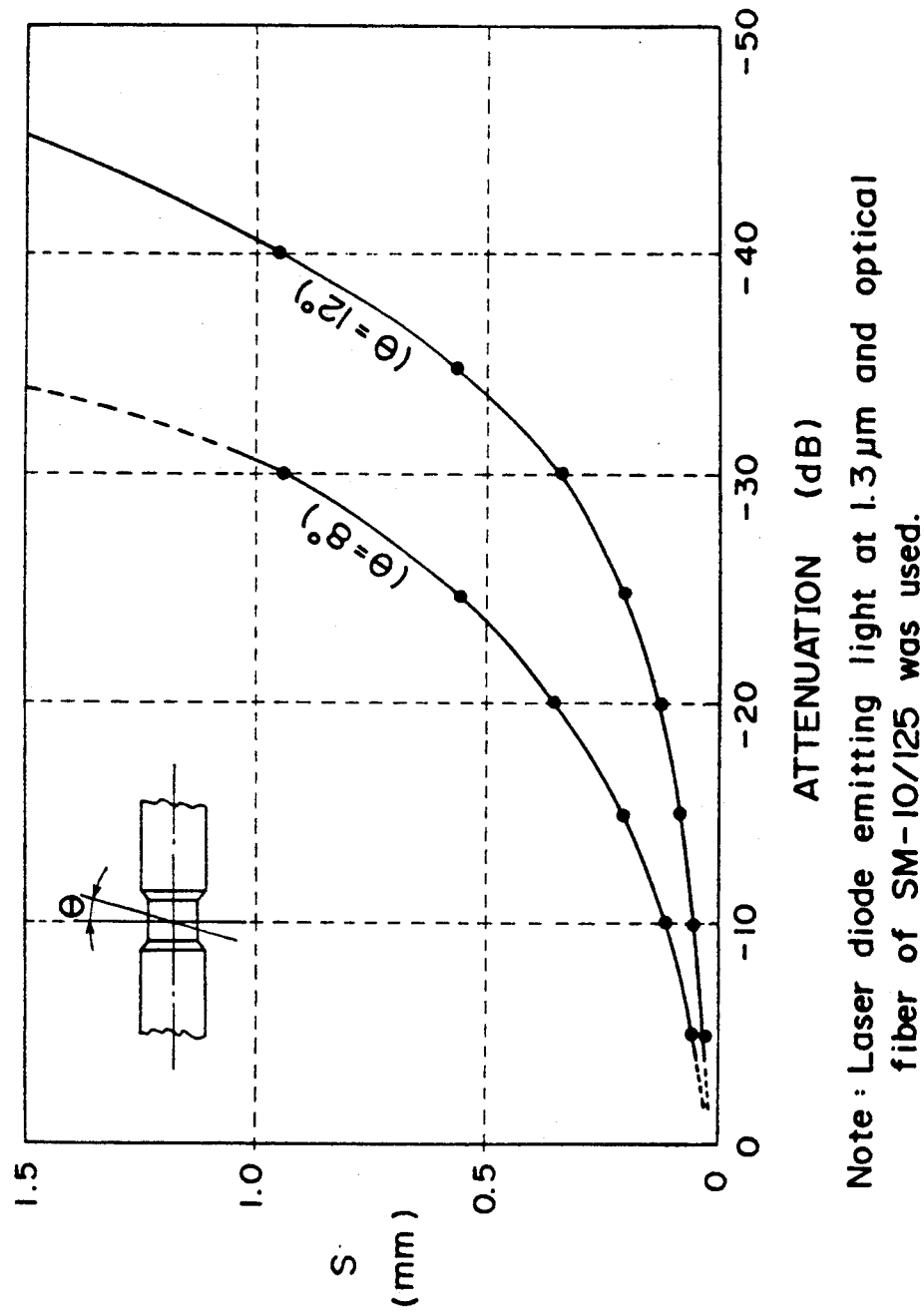
FIG. 4 shows inter-ferrule gap S in terms of the attenuation in the variable light attenuator built in accordance with the present invention.

FIG. 4 shows a graph of distance S versus attenuation (dB). Distance S is defined by the distance between the right-hand edge of first ferrule and the left-hand edge of second ferrule.

Angle $\theta$ of the edges of the ferrules with respect to the plane perpendicular to the optical axis common to the respective ferrules in the variable light attenuator was specified as 8 degrees and 12 degrees in FIG. 4.

The attenuation increases with distance S and also with angle $\theta$ as shown in FIG. 4.

Figure 5:
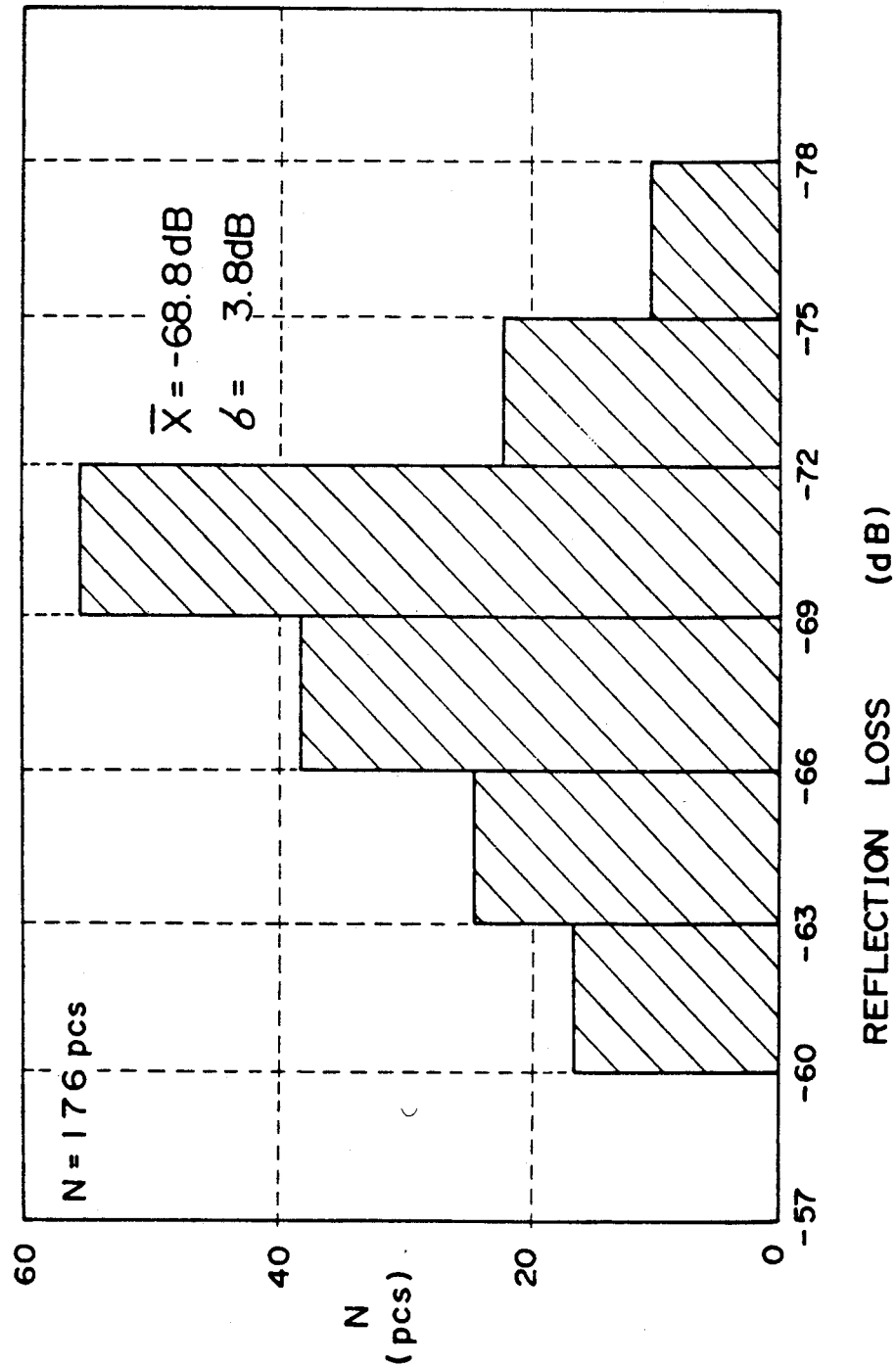
FIG. 5 shows a histogram of the measured light power loss due to the reflection at the interfaces between the optical components and the intermediate air gaps for a number of variable light attenuator units fabricated in accordance with the present invention.
Figure 6:
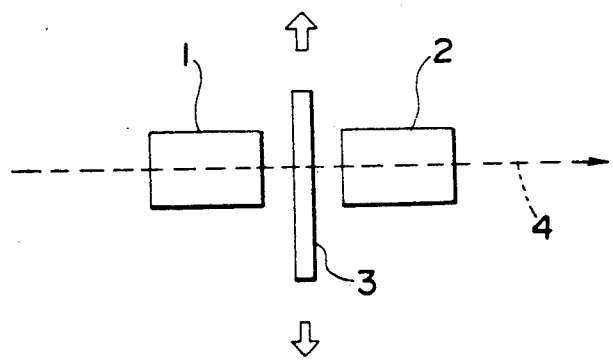
FIG. 6 is a side view of the conventional variable light attenuator.
Figure 7:
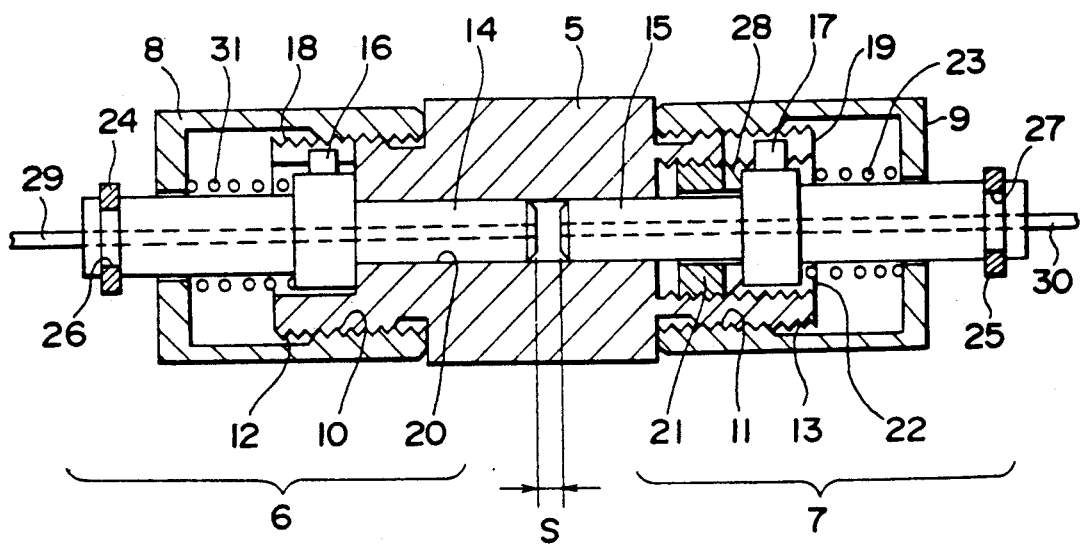
FIG. 7 shows a cross-sectional view of the variable light attenuator already proposed by the inventor.

FIG. 5 shows a histogram of the number of variable light attenuator units fabricated in accordance with the present invention, which was measured in terms of the reflection loss.

The optical fiber of type SM-10/125 was used for fabrication of the variable light attenuator. This optical fiber is a single mode fiber with a core diameter of 10 $\mu$m and a clad diameter of 125 $\mu$m.

One hundred and seventy six units wherein $\theta$ was selected 12 degrees were fabricated in accordance with the prescribed structure, and the reflection losses for these units were measured. During the measurement, a laser diode with an emission wavelength of 1.3 $\mu$m was used as a light source.

The average reflection loss was $-68.8$ dB with a standard deviation of 3.8 dB.

As described heretofore, the variable light attenuator according to the present invention can be built utilizing the optical connector structure with some variations.

The inner edges of the ferrules in the optical connector plugs are scrubbed to be inclined at 7 degrees or more with respect to the plane perpendicular to the optical axis thereof depending on the attenuation thereon. One of these ferrules in the optical connector plugs is inserted into the alignment adapter without revolution around its optical axis, and the other ferrule is forwarded or reversed without revolving around the optical axis. Both inner edges of first and second ferrules are kept in parallel while distance S between first and second ferrules is set arbitrarily so that the attenuation can be as specified. Thus, the attenuation can be set easily, unlike the conventional version, without repetitive operations of attachment, measurement, and detachment of the ferrules.

The variable light attenuator units with such excellent reflection loss performance as indicated on the histogram of the number of units in terms of the reflection loss in FIG. 5 can be fabricated on a mass-production line. The variable light attenuator built in accordance with the present invention is advantageous over that in the conventional case in simplicity of the structure, easiness of the adjustment, and excellence in the reflection loss. The variable light attenuator built in accordance with the present invention has no limitation on the usage.

What is claimed is:

1. A variable light attenuator which transmits light power from first to second optical fibers through first and second ferrules after attenuating it by a specified ratio of light power when the light power input from the first optical fiber to first ferrule is transmitted to second optical fiber through second ferrule which is coupled with the first ferrule via an intermediate air gap for use in optical power attenuation comprising:
    an alignment adapter which provides an alignment through hole concentrically passing therethrough along the optical axis thereof;
    first ferrule fastening means which fastens the first ferrule whose edge is exposed to the intermediate air gap together with the edge of the first optical fiber and is a certain degree inclined to the optical axis, passes the first ferrule through the alignment through hole, and then fastens the first ferrule to the alignment adapter; and
    second ferrule fastening means which fastens second ferrule whose edge is exposed to the intermediate air gap together with the edge of the second optical fiber is inclined to the optical axis thereof the same degrees as those of the first ferrule, inserts the second ferrule to the alignment through hole in the opposite side to that whereto the first ferrule is inserted, advances the second ferrule toward the first ferrule without revolving the second ferrule, and sets the gap between the first and second ferrules at an arbitrary value while keeping the edge of the first ferrule together with the edge of the first optical fiber in parallel with the edge of the second ferrule together with the edge of the second optical fiber.

2. A variable light attenuator as claimed in claim 1, wherein the structure of the first ferrule fastening means is the same as that of the second ferrule fastening means.

3. A variable light attenuator as claimed in claim 1, wherein the first and second ferrules respectively having the edges which are exposed to the intermediate air gap together with the edges of the first and second optical fibers are finished the same 7 degrees or more inclined to a plane perpendicular to the optical axis common to the first and second ferrules.

4. A variable light attenuator as claimed in claim 1, wherein the alignment adapter provides a central portion greater in diameter than that of its edge portions whereto screws with key grooves are provided.

5. A variable light attenuator as claimed in claim 1, wherein the second ferrule fastening means provides a circular flange in the rear portion thereof, and a key pin which can fit to the key groove of the alignment adapter.

6. A variable light attenuator as claimed in claim 5, wherein the second ferrule fastening means further comprises:
    a ferrule holder which is used to guide the edge of the second ferrule to the alignment through hole so that the second ferrule can pass through the alignment through hole along the optical axis thereof;
    an adjusting nut being a cap nut which can contact to a screw of the alignment adapter in an open side thereof, and which provides a through hole to fasten the ferrule holder to cause the second optical fiber to pass through at the center of the cap portion thereof, so as to mate with the circular flange of the ferrule holder; and
    stop means which clamps the ferrule holder wherewith the through hole of the adjusting nut can mate, and is located to the other side of the circular flange of the ferrule holder while there exists a gap between the circular flange and the stop means so that the cap nut can revolve on the ferrule holder.

7. A variable light attenuator as claimed in claim 4, wherein the stop means can be a nut which can mate with another screw provided on the circumference at the outer edge of the ferrule holder.

8. A variable light attenuator as claimed in claim 4, wherein the stop means can be a stop ring which can mate with a groove provided on the circumference at the outer edge of the ferrule holder.

9. A variable light attenuator as claimed in claim 4, wherein a locknut can further be used for fastening the adjusting nut to the stop means.

* * * * *